(12) United States Patent
Shiraishi

(10) Patent No.: US 9,370,953 B1
(45) Date of Patent: Jun. 21, 2016

(54) PRINTER APPARATUS

(71) Applicant: TOSHIBA TEC KABUSHIKI KAISHA, Shinagawa-ku, Tokyo (JP)

(72) Inventor: Norihisa Shiraishi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/739,388

(22) Filed: Jun. 15, 2015

(51) Int. Cl.
*B41J 29/38* (2006.01)
*H04N 1/04* (2006.01)
*B41J 3/28* (2006.01)
*B41J 3/51* (2006.01)

(52) U.S. Cl.
CPC . *B41J 29/38* (2013.01); *H04N 1/04* (2013.01); *B41J 3/283* (2013.01); *B41J 3/51* (2013.01)

(58) Field of Classification Search
None
See application file for complete search history.

(56) References Cited

U.S. PATENT DOCUMENTS 6,404,335 B1 * 6/2002 Ohno ............... G06K 1/121
340/5.1

FOREIGN PATENT DOCUMENTS

JP 02-187886 7/1990

* cited by examiner

*Primary Examiner* — Lisa M Solomon
(74) *Attorney, Agent, or Firm* — Amin, Turocy & Watson LLP

(57) ABSTRACT

In accordance with an embodiment, a printer apparatus comprises an insert and eject slot; a medium conveyance section configured to convey a print medium on which code information is arranged and which is inserted from the insert and eject slot towards a predetermined printing position, and convey the print medium from the printing position to the insert and eject slot from which the print medium is ejected; a printing section configured to carry out printing on the print medium sent to the printing position; a code information reading section configured to read the code information arranged on the print medium; and an acquisition section configured to acquire the code information based on reading data of the code information read by the code information reading section multiple times at a predetermined distance.

5 Claims, 6 Drawing Sheets

PRINTER APPARATUS

FIELD

Embodiments described herein relate generally to a printer apparatus which can correctly acquire code information arranged in a print medium.

BACKGROUND

Nowadays, code information such as a barcode and the like for specifying information of passbook owner is arranged in a booklet such as a passbook used in financial institutions. A reading section for reading these codes is arranged in an automated teller machine called as an "ATM" (Automated teller machine) which handles the passbook, and customer information and transaction information corresponding to the code information are acquired from a deposit server and the like connected with the ATM based on the code information read by the reading section. However, if the code information in an inclined state is read by the reading section, a reading error happens. In this reason, it is known to prevent the reading error by inclining the reading section in association with the inclined code information. However, there is a problem that a mechanism which inclines the reading section increases cost and magnifies the whole printer apparatus.

DETAILED DESCRIPTION

In accordance with an embodiment, a printer apparatus is equipped with an insert and eject slot; a medium conveyance section configured to convey a print medium on which code information is arranged and which is inserted from the insert and eject slot towards a predetermined printing position, and convey the print medium from the printing position to the insert and eject slot from which the print medium is ejected; a printing section configured to carry out printing on the print medium sent to the printing position; a code information reading section configured to read the code information arranged on the print medium; and an acquisition section configured to acquire the code information based on reading data of the code information read by the code information reading section multiple times at a predetermined distance.

Hereinafter, according to the embodiment of the present invention, a printer is described in detail with reference to the accompanying drawings.

Figure 1:
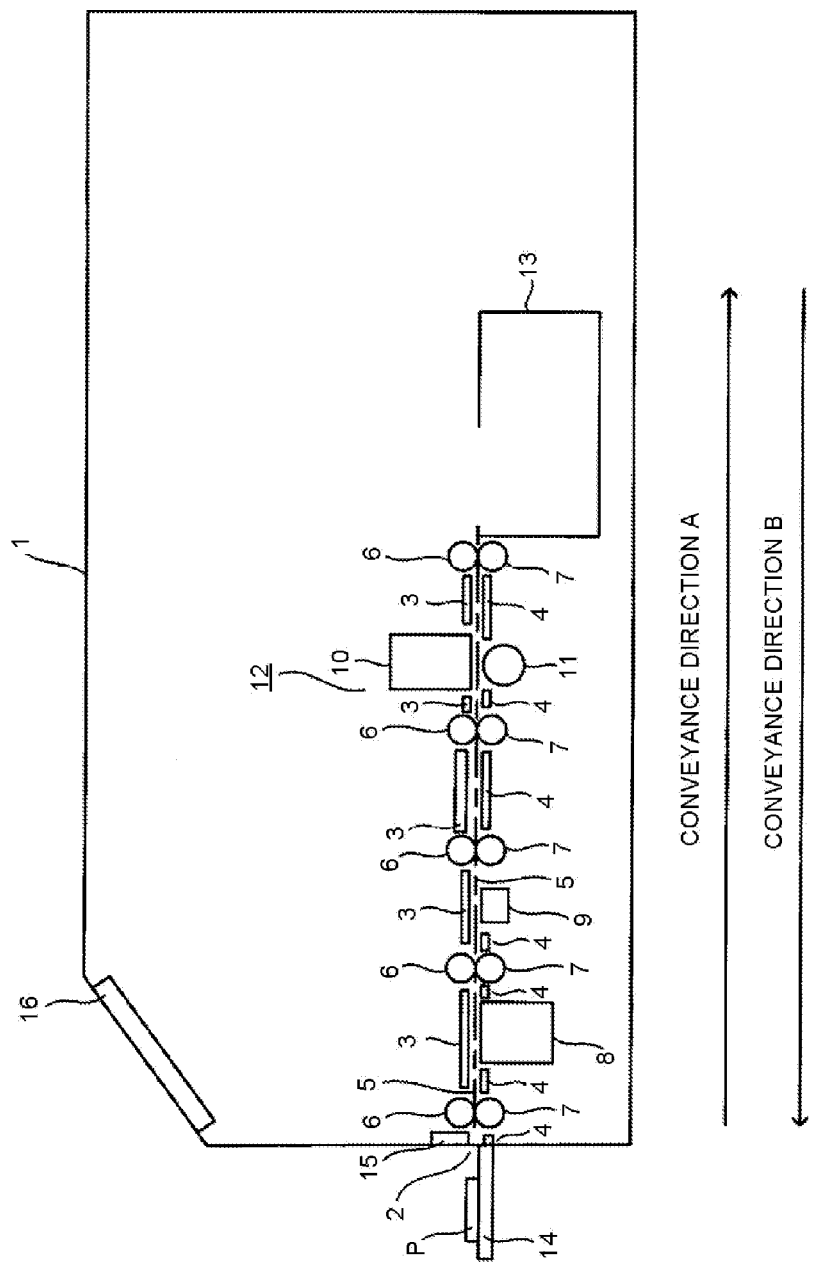
FIG. 1 is a diagram illustrating main portions of a printer according to one embodiment.

FIG. 1 is a diagram illustrating main portions of a printer according to a first embodiment.

A printer apparatus 1 conveys a booklet-shaped print medium P inserted from an insert and eject slot 2 to a later described printing section 12, and ejects the print medium P from the insert and eject slot 2 to the outside of the printer apparatus 1 after the printing termination. In the description of the present embodiment, the left side is recorded as the front side of the printer apparatus 1 and the right side is recorded as the rear side of the printer apparatus 1 in FIG. 1. A direction in which the print medium P is conveyed from the insert and eject slot 2 to the printing section 12 is described as a conveyance direction A, and a reverse direction is described as a conveyance direction B.

The insert and eject slot 2 for inserting a booklet P such as a passbook and the like and ejecting the booklet P on which the printing is completed to the outside of the printer apparatus 1 is arranged at the front side of the printer apparatus 1.

A retraction bin 13 which collects and stores the booklet P a user forgets to take is arranged at the rear side of the printer apparatus 1.

A first upper conveyance guide 3 and a first lower conveyance guide 4 are extended and arranged from the insert and eject slot 2 to the retraction bin 13, and the booklet P is conveyed at a medium conveyance path 5 between the first upper conveyance guide 3 and the first lower conveyance guide 4.

A feed roller 6 which can be rotated by a motor (not shown) and an idler roller 7 opposite to the feed roller 6 across the medium conveyance path 5 are arranged at the downstream side of the conveyance direction A of the insert and eject slot 2. The feed roller 6 and the idler roller 7 are a pair, and nip the booklet P to convey it. Further, the feed rollers 6 and the idler rollers 7 are set to a plurality of pairs along the medium conveyance path 5.

An alignment section 8 is arranged at the downstream side of the conveyance direction A of the insert and eject slot 2. The alignment section 8, which is constituted by a paper position detection sensor, a shutter, a paper pinch mechanism, an alignment side end wall (not shown) and the like, corrects a skew and a position shift of the booklet P inserted from the insert and eject slot 2 and moves the booklet P to a preset position and posture.

A code reading section 9 called as a CIS (CONTACT IMAGE SCANNER) is arranged at the downstream side of the conveyance direction A of the alignment section 8. The code reading section 9 reads the later described code information arranged inside the booklet P.

A dot head 10 and a platen roller 11 opposite to the dot head 10 across the medium conveyance path 5 are arranged at the downstream side of the conveyance direction A of the code reading section 9. The printing section 12 has the dot head 10 and the platen roller 11 to carry out printing on the booklet P.

The retraction bin 13 is arranged at the downstream side of the conveyance direction A of the printing section 12.

In a case in which the booklet P is inserted to the printer apparatus 1 and when the booklet P is ejected to the user, an insert and discharge table 14 for temporarily placing the booklet P is arranged nearby the insert and eject slot 2 serving as the front side of the printer apparatus 1. A collection sensor 15 for detecting whether or not the booklet P is taken away by the user is arranged at the insert and eject slot 2. A display section 16 for displaying various states of the printer apparatus 1 including errors such as paper jam and paper out is arranged on the printer apparatus 1.

Figure 2:
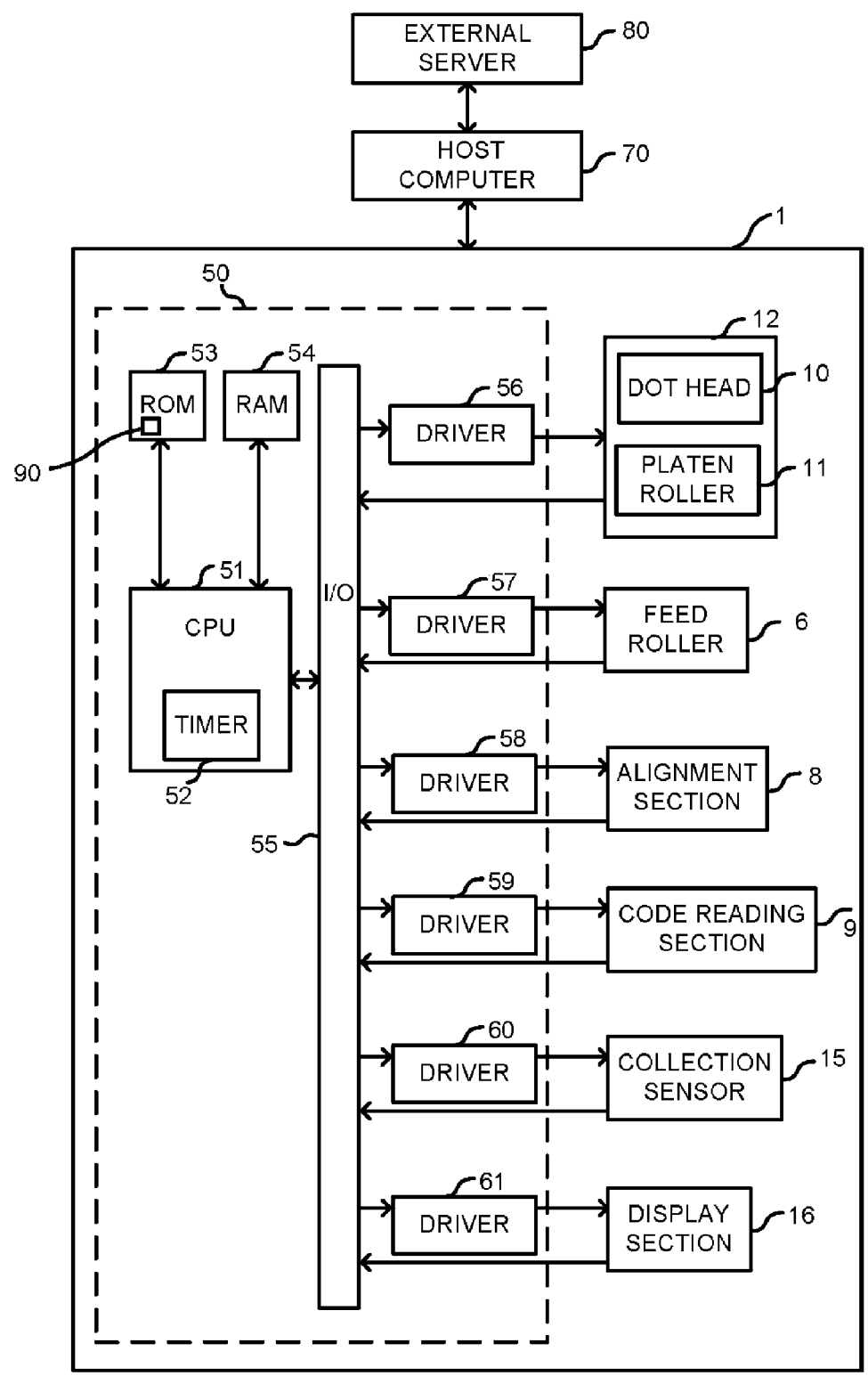
FIG. 2 is a block diagram illustrating the constitution of a control circuit of the printer according to the embodiment.
Figure 3:
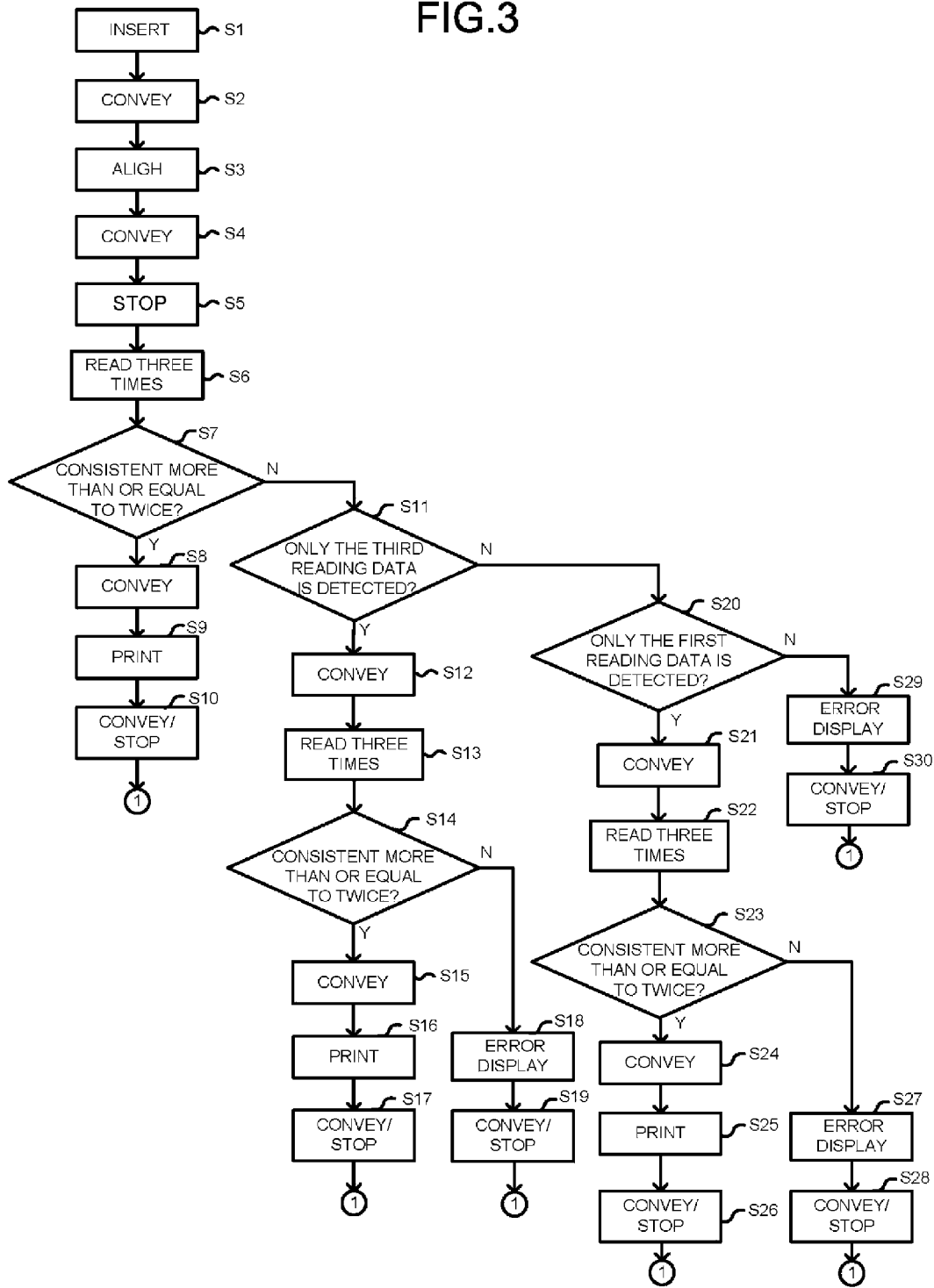
FIG. 3 is a flowchart illustrating a code information acquisition method and a code information re-acquisition method according to the embodiment.
Figure 4:
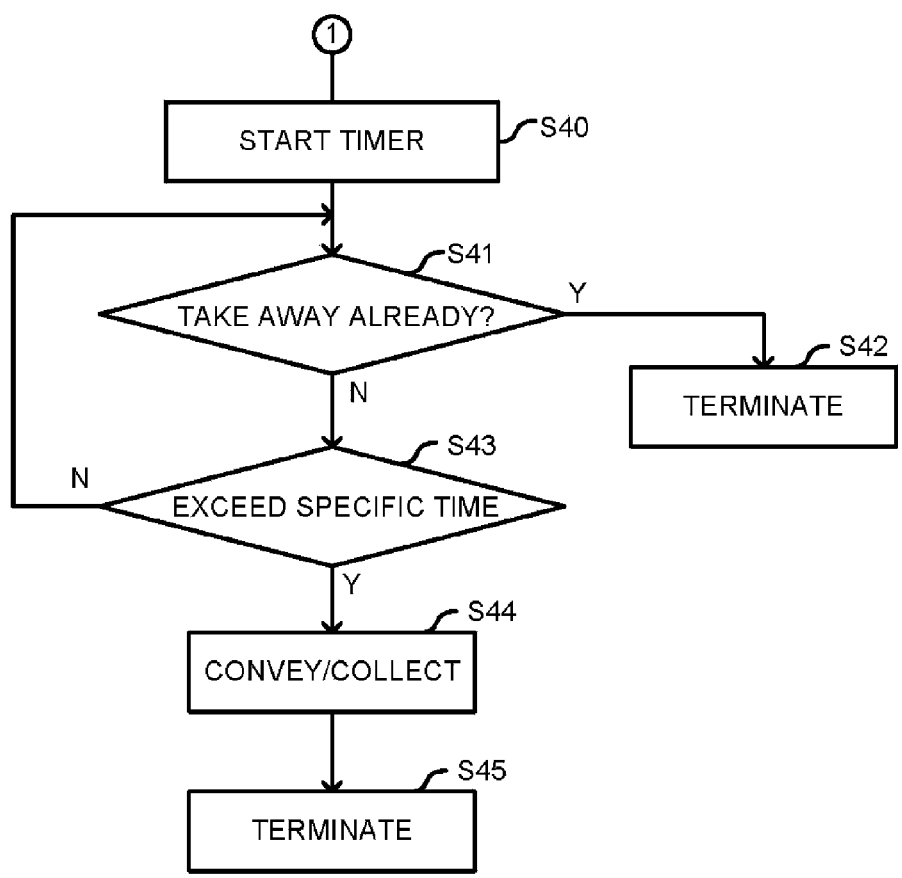
FIG. 4 is a flowchart illustrating a print medium retraction method according to the embodiment.

FIG. 2 is a block diagram illustrating the constitution of a control circuit of the printer apparatus 1 according to the embodiment. A control section 50 controls a medium conveyance, code information recognition, a printing, a medium discharge, a medium retraction and a situation display of the printer apparatus 1.

The control section 50, which links up with a host computer 70 and executes various controls, is constituted by, for example, a microcomputer. The host computer 70 is connected with an external server 80 such as financial institutions managing saving deposit information and the like.

A central processing unit (CPU) 51 of the control section 50 carries out various controls and calculations of the medium conveyance, the code information recognition, the printing, the medium discharge, the medium retraction and the like according to the programs.

The CPU 51 includes a timer 52 as a module for carrying out a time setting and a time control.

The control section 50 includes an RAM 54 and an ROM 53 as a main storage module for storing the control programs executed by the CPU 51 and data during the control or the calculation.

The ROM 53 is read only memory for storing control programs and tables, and the RAM 54 is random access memory for storing data generated during the calculation.

A code detection determination program 90 is stored in the ROM 53. A first printing section proprietary section 92 and a second printing section proprietary section 93 are arranged in the RAM 54.

An input/output unit (I/O) 55 which acquires various input data from the host computer 70 and takes out control output of the control section 50 to the host computer 70 is arranged in the control section 50. The I/O 55 is connected with the CPU 51, the ROM 53 and the RAM 54 through a bus line.

The I/O 55 is connected with a first driver 56, a second driver 57, a third driver 58, a fourth driver 59, a fifth driver 60 and a sixth driver 61 as modules for taking out the control output.

The first driver 56 supplies a necessary driving output to the printing section 12. The second driver 57 supplies the driving output to the feed roller 6. The third driver 58 supplies the driving output to the alignment section 8. The fourth driver 59 supplies the driving output to the code reading section 9. The fifth driver 60 supplies the driving output to the collection sensor 15. The sixth driver 61 supplies the driving signal to the display section 16.

Hereinafter, the operations of the printer apparatus 1 are described using FIG. 3 to FIG. 9.

The printer apparatus 1 is used in a state of being incorporated with the automated teller machine. Herein, the bookkeeping is exemplified.

The user opens the booklet P and inserts it from the insert and eject slot 2 according to the instruction displayed on the display section 16 (S1). The printer apparatus 1 rotates the feed roller 6, and conveys the booklet P to the alignment section 8 through the cooperation with the idler roller 7 (S2). The alignment section 8 corrects the skew and the position shift of the conveyed booklet P to align the booklet P to the preset position and posture (S3). The alignment mechanism is a known mechanism, therefore, the detailed description is omitted.

Next, the aligned booklet P is conveyed to the code reading section 9 through the cooperation between the feed roller 6 and the idler roller 7 (S4). Hereinafter, the position relation of the booklet P, a code information C and the code reading section 9 is illustrated using FIG. 5.

The code information C printed on a label paper and the like is pasted on the used booklet P. In the present embodiment, the code information C is described as a barcode. The label paper on which the code information C is printed is arranged towards the lower side of the booklet P such that the surface thereof faces the code reading section 9 shown in FIG. 1. The code reading section 9 is extended in a medium width direction of the booklet P as shown in FIG. 5, and can detect data corresponding to one line indicated by "L".

Figure 5:
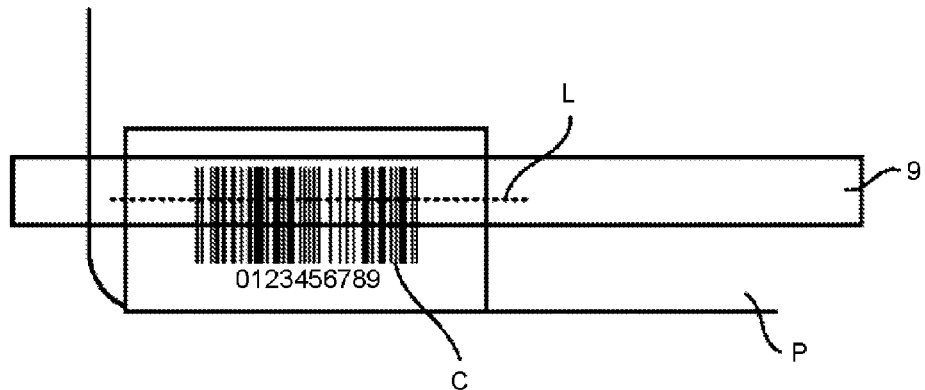
FIG. 5 is an illustration diagram illustrating a position relation between a code reading section and code information according to the embodiment.

In a case in which the label paper on which the code information C is printed is correctly pasted, the booklet P conveyed (S4) to the code reading section 9 is stopped at a position where the "L" serving as the detection line of the code reading section 9 shown in FIG. 5 is located at the center of the code information C (S5).

Sequentially, the control section 50 uses the code detection determination program 90 to read the code information C. Next, the control section 50 drives the feed roller 6 to convey the booklet P only at a predetermined distance H to read the code information C again. The predetermined distance H is described later. Then, the control section 50 drives the feed roller 6 again to convey the booklet P only at a predetermined distance H to read the code information C. That is, herein, the control section 50 reads the code information C three times (S6).

Next, the control section 50 determines whether or not the code information C can be read consistently more than or equal to twice from the three times of reading data (S7). Herein, in a case in which the code information C can be read consistently more than or equal to twice (YES in S7), it is determined that the reading of the code information C is carried out correctly, and the code information C is sent to the external server 80. Then, the printing information corresponding to the code information C is acquired from the external server 80. Afterwards, the control section 50 drives the feed roller 6 to convey the booklet P to the printing section 12 (S8), and then the printing on the booklet P is carried out by the printing section 12 (S9).

If the printing is completed, the control section 50 drives the feed roller to convey the booklet P to the conveyance direction B, and makes the booklet P stop at a position where the booklet P is detected by the collection sensor 15 arranged nearby the insert and eject slot 2 (S10).

Figure 6:
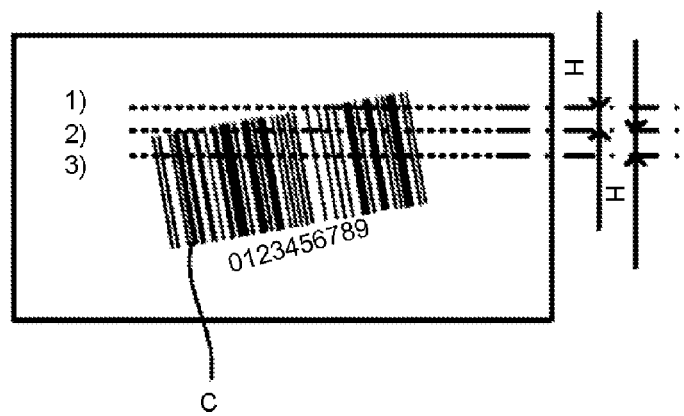
FIG. 6 is an illustration diagram illustrating an example of a code information acquisition according to the embodiment.
Figure 7:
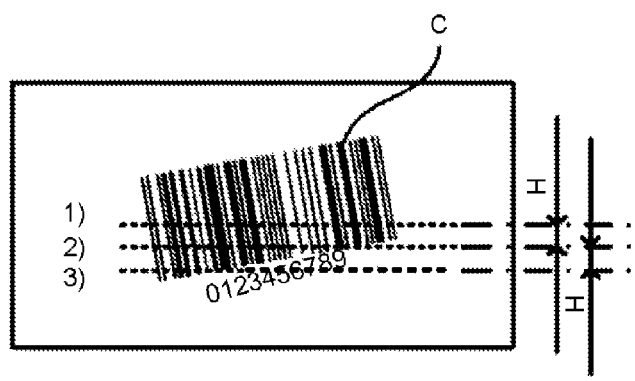
FIG. 7 is an illustration diagram illustrating an example of the code information acquisition according to the embodiment.
Figure 8:
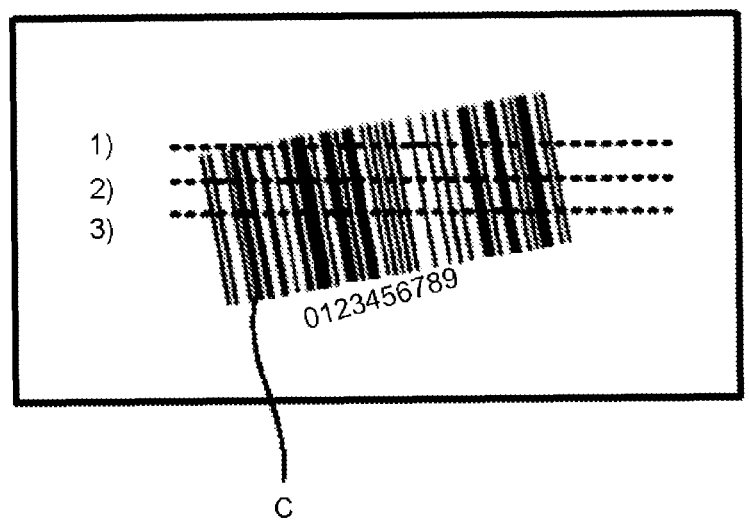
FIG. 8 is an illustration diagram illustrating an example of a code information re-acquisition according to the embodiment.
Figure 9:
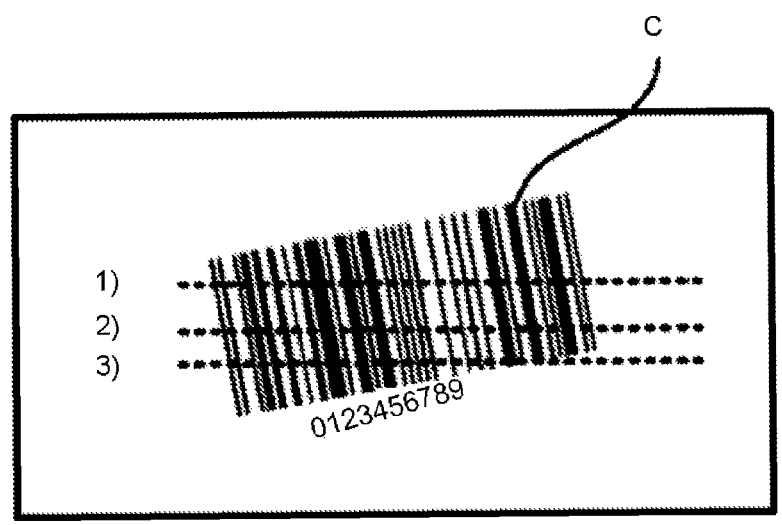
FIG. 9 is an illustration diagram illustrating an example of the code information re-acquisition according to the embodiment.

An example in which the pasted code information shown in FIG. 6 and FIG. 7 is inclined is illustrated. In the present embodiment, it is exemplified that the code information C is arranged at the upper right; however, a case in which the code information C is arranged at the lower right may be considered in the same manner.

In FIG. 6 and FIG. 7, 1) is a position where as stated above, if the label paper is correctly pasted, the "L" serving as the detection line of the code reading section 9 shown in FIG. 5 is located at the center of the code information C. At this position, the code information C is read and then conveyed. At the position 2), the code information C is read and then conveyed. At the position 3), the code information C is read. The distance H described above is the distance between 1) and 2) and the distance between 2) and 3), and the distance H is about one quarter of the length of the height direction of the arranged code information.

In S7, if the code information C cannot be read consistently more than or equal to twice from the three times of reading data (NO in S7), the control section 50 determines whether or not only the third reading data within the three times of reading data of the code information C can be read (S11). If only the third reading data within the three times of reading data of the code information C can be read, it is expected that the code information C is arranged at the downstream side in the conveyance direction A of the correct position. This example is shown in FIG. 6. If only the third reading data within the three times of reading data of the code information C can be read (YES in S11), the former code information C is read at the position 3); however, the booklet P is conveyed such that the "L" serving as the detection line of the code reading section 9 in this measurement is turned into the position 2) in this measurement, and then the booklet P is conveyed again only at a distance H (S12). At the position 1), the code information C is read and conveyed at a distance H. At the position 2), the code information C is read and conveyed at a distance H. At the position 3), the code information C is read (S13). Further, it is unnecessary that the conveyance of the booklet P is divided twice, that is, the booklet P is conveyed to the position 2) and then conveyed to the position 1); the booklet P may be conveyed to the position 1) once.

Next, the control section 50 determines whether or not the code information C can be read consistently more than or equal to twice from the three times of reading data acquired again (S14). Herein, in a case in which the code information C can be read consistently more than or equal to twice (YES in S14), it is determined that the reading of the code information C is carried out correctly, and the code information C is sent to the external server 80. Then, the printing information corresponding to the code information C is acquired from the external server 80. Afterwards, the control section 50 drives the feed roller 6 to convey the booklet P to the printing section 12 (S15), and then the printing on the booklet P is carried out by the printing section 12 (S16).

If the printing is completed, the control section 50 drives the feed roller to convey the booklet P to the conveyance direction B, and makes the booklet P stop at the position where the booklet P is detected by the collection sensor 15 arranged nearby the insert and eject slot 2 (S17).

In S14, herein, in a case in which the code information C cannot be read consistently more than or equal to twice (NO in S14), it is expected that there is trouble that the code information C is seriously inclined, and in this case, the error display and the like is displayed on the display section 16 (S18). The booklet P is conveyed to the conveyance direction B, and is stopped at the position where the booklet P is detected by the collection sensor 15 arranged nearby the insert and eject slot 2 (S19).

On the other hand, in S11, if only the third reading data within the three times of reading data of the code information C cannot be read (NO in S11), next, it is determined whether or not only the first reading data within the three times of reading data of the code information C can be read (S20). In a case in which only the first reading data within the three times of reading data of the code information C can be read, it is expected that the code information C is arranged at the upstream side in the conveyance direction A of the correct position. This example is shown in FIG. 7. In a case in which only the first reading data within the three times of reading data of the code information C can be read (YES in S20), the former code information C is read at the position 1); however, the booklet P is conveyed such that the "L" serving as the detection line of the code reading section 9 in this measurement is turned into the position 2) in this measurement, and then the booklet P is conveyed again at a distance H (S21). At the position 1), the code information C is read and conveyed at a distance H. At the position 2), the code information C is read and conveyed at a distance H. At the position 3), the code information C is read (S22). Further, it is unnecessary that the conveyance of the booklet P is divided twice, that is, the booklet P is conveyed to the position 2) and then conveyed to the position 1); the booklet P may be conveyed to the position 1) once.

Next, the control section 50 determines whether or not the code information C can be read consistently more than or equal to twice from the three times of reading data acquired again (S23). Herein, in a case in which the code information C can be read consistently more than or equal to twice (YES in S23), it is determined that the reading of the code information C is carried out correctly, and the code information C is sent to the external server 80. Then, the printing information corresponding to the code information C is acquired from the external server 80. Afterwards, the control section 50 drives the feed roller 6 to convey the booklet P to the printing section 12 (S24), and then the printing on the booklet P is carried out by the printing section 12 (S25).

If the printing is completed, the control section 50 drives the feed roller to convey the booklet P to the conveyance direction B, and makes the booklet P stop at the position where the booklet P is detected by the collection sensor 15 arranged nearby the insert and eject slot 2 (S26).

In S23, herein, in a case in which the code information C cannot be read consistently more than or equal to twice (NO in S23), it is expected that there is trouble that the code information C is seriously inclined, and in this case, the error display and the like is displayed on the display section 16 (S27). The booklet P is conveyed to the conveyance direction B, and is stopped at the position where the booklet P is detected by the collection sensor 15 arranged nearby the insert and eject slot 2 (S28).

On the other hand, in S20, if only the first reading data within the three times of reading data of the code information C cannot be read (NO in S20), it is expected that there is trouble that the code information C is seriously inclined, and in this case, the error display and the like is displayed on the display section 16 (S29). The booklet P is conveyed to the conveyance direction B, and is stopped at the position where the booklet P is detected by the collection sensor 15 arranged nearby the insert and eject slot 2 (S30).

As stated above, in a case where the printing is carried out on the booklet P on which the code information C is read correctly, if the printing is completed, the control section 50 drives the feed roller to convey the booklet P to the conveyance direction B, and makes the booklet P stop at the position where the booklet P is detected by the collection sensor 15 arranged nearby the insert and eject slot 2 (S10, S17 and S26). Further, even if the code information C is not read correctly, the booklet P in which the error display is carried out is conveyed to the conveyance direction B, and is stopped at the position where the booklet P is detected by the collection sensor 15 arranged nearby the insert and eject slot 2 (S19, S28 and S30). In any case, afterwards, the booklet P is returned to the user; however, there is a case in which the user forgets to take the booklet away. Information and the like, which is unknown to others, is recorded on the booklet P, therefore, it is necessary to collect the booklet P if the user forgets to take the booklet away. Hereinafter, a collection method is described in FIG. 1 and FIG. 4.

The collection sensor 15 serving as a transmission-type sensor is arranged at the insert and eject slot 2. The collection sensor 15 is arranged nearby the insert and eject slot 2, and when the booklet P is stopped at the detection range of the collection sensor 15, it is possible to detect whether the booklet is located at this position. If the booklet P is stopped at the position where the booklet P is detected by the collection sensor 15 arranged nearby the insert and eject slot 2 (S10, S17 S19, S26, S28 and S30), the timer 52 starts the timer to start a time measurement (S40), and the sensor signal of the collection sensor 15 is turned into "on". The time measurement measured by the timer 52 is described later.

Next, the control section 50 confirms whether or not the user takes the booklet P away at regular intervals (S41). Whether the user takes the booklet P away is confirmed through the detection signal of the collection sensor 15. When there is the booklet P, the signal of the collection sensor 15 is turned into "on". However, if the user takes the booklet P away, the sensor signal of the collection sensor 15 is turned into "OFF". It is possible to confirm whether or not the user takes the booklet P away through the switch.

If it is confirmed that the user takes the booklet P away (YES in S41), the processing is terminated (S42).

In S41, if it is determined that the user does not take the booklet P away (NO in S41), the control section 50 confirms the time of the started time measurement at the time of stopping the conveyance of the booklet P, and confirms whether or not the time exceeds the specific time (S43). Further, herein, the specific time means how much time it takes from the moment the user may be in a state of taking the booklet P away to the moment the user finally leaves the booklet P behind, and is a preset time, for example, 30 seconds.

If the time does not exceed the specific time (NO in S43), the customer may take the booklet away, and then the processing in S41 is carried out again.

In S43, if the time exceeds the specific time (YES in S43), it is determined that the possibility that the user forgets to take the booklet P away is high. The control section 50 rotates the feed roller 6 to convey the booklet P to the conveyance direction A to collect the booklet P in the retraction bin 13 through the cooperation with the idler roller 7 (S44), and then the processing is terminated (S45).

According to the present embodiment stated above, even if the code information is arranged to be inclined, a position where the code information can be read can be detected automatically and the reading can be carried out. In this way, the error can be reduced because the code information is read more than once. Further, it is unnecessary to arrange a mechanism to rotate the code reading section and the booklet.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printer apparatus, comprising:
an insert and eject slot;
a medium conveyance section configured to convey a print medium on which code information is arranged and which is inserted from the insert and eject slot towards a predetermined printing position, and convey the print medium from the printing position to the insert and eject slot from which the print medium is ejected;
a printing section configured to carry out printing on the print medium sent to the printing position;
a code information reading section configured to read the code information arranged on the print medium; and
an acquisition section configured to acquire the code information based on reading data of the code information read by the code information reading section multiple times at a predetermined distance with respect to the code information, wherein
the acquisition section acquires the code information based on the reading data in a case in which more than half of the reading data within the reading data read by the code information reading section multiple times is consistent each other.

2. The printer according to claim 1, wherein
the acquisition section cannot acquire the code information in a case in which more than half of the reading data within the reading data read by the code information reading section multiple times is not consistent with each other.

3. The printer according to claim 2, further comprising:
an error notification section configured to notify error in a case in which the acquisition section cannot acquire the code information.

4. The printer according to claim 2, wherein
the code information reading section reads the reading data multiple times based on the reading data read in a case in which the acquisition section cannot acquire the code information.

5. A method, comprising:
conveying a print medium on which code information is arranged and which is inserted from an insert and eject slot towards a predetermined printing position;
conveying the print medium from the printing position to the insert and eject slot from which the print medium is ejected;
carrying out printing on the print medium sent to the printing position;
reading the code information arranged on the print medium; and
acquiring the code information based on reading data of the code information read multiple times at a predetermined distance with respect to the code information, comprising acquiring the code information based on the reading data in a case in which more than half of the reading data within the reading data is consistent each other.

* * * * *